United States Patent [19]

Marchello

[11] 4,176,880
[45] Dec. 4, 1979

[54] BICYCLE SEAT

[76] Inventor: John L. Marchello, 57751 Grand River, New Hudson, Mich. 48165

[21] Appl. No.: 929,192

[22] Filed: Jul. 28, 1978

[51] Int. Cl.² .............................................. A47C 7/02
[52] U.S. Cl. ................................... 297/452; 297/214
[58] Field of Search ............... 297/195, 452, 201, 204, 297/202, 214; 5/120, 127, 128, 129, 130

[56] References Cited

U.S. PATENT DOCUMENTS

| 337,171 | 3/1886 | Lillibridge | 297/202 |
| 435,385 | 9/1890 | Babbitt | 297/202 |
| 471,417 | 3/1892 | Bunker | 297/195 |
| 638,519 | 12/1899 | Meisselbach, Jr. et al. | 297/202 |
| 3,874,730 | 4/1975 | Marchello | 297/452 |

*Primary Examiner*—Roy D. Frazier
*Assistant Examiner*—Peter A. Aschenbrenner
*Attorney, Agent, or Firm*—Cullen, Sloman, Cantor, Grauer, Scott & Rutherford

[57] ABSTRACT

An improved bicycle seat of the hammock type which has two padded seats covering the basic webbing between the legs of a U-shaped seat frame. The padded seats are covered with a frictionally roughened surface on the seat side and are sectioned such that the pad is depressed in several increments to form sections. Further, the individual sections have a center depression and hole. The end sections are not affixed to the webbing and are of larger dimension than the center section and further do not contain a central depression. The ends of the leftmost and rightmost center sections contain a sleeve entrance on the underside for containing the web portion of the seat frame attachment.

6 Claims, 6 Drawing Figures

U.S. Patent  Dec. 4, 1979  4,176,880
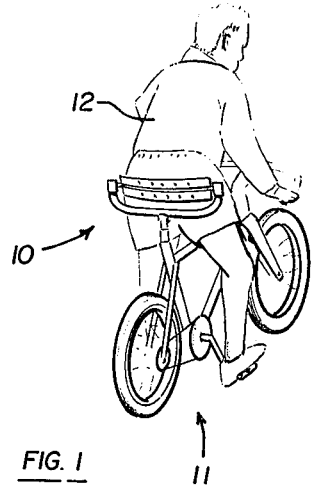
FIG. 1
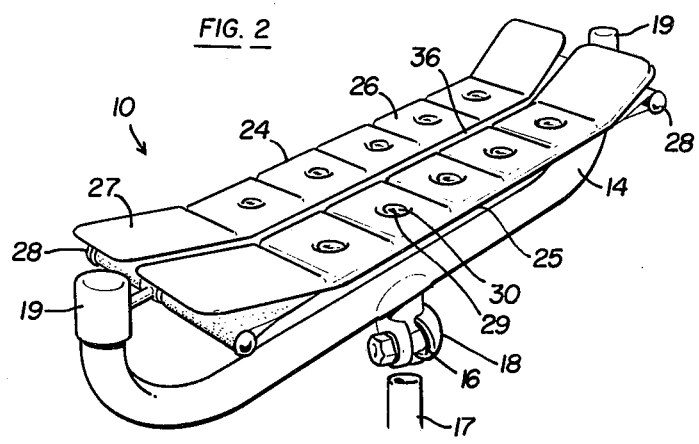
FIG. 2
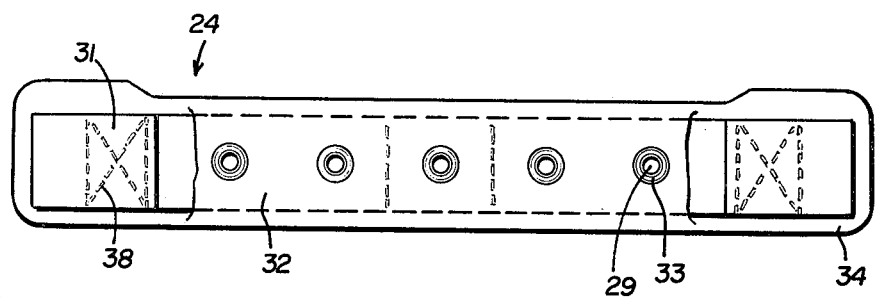
FIG. 3
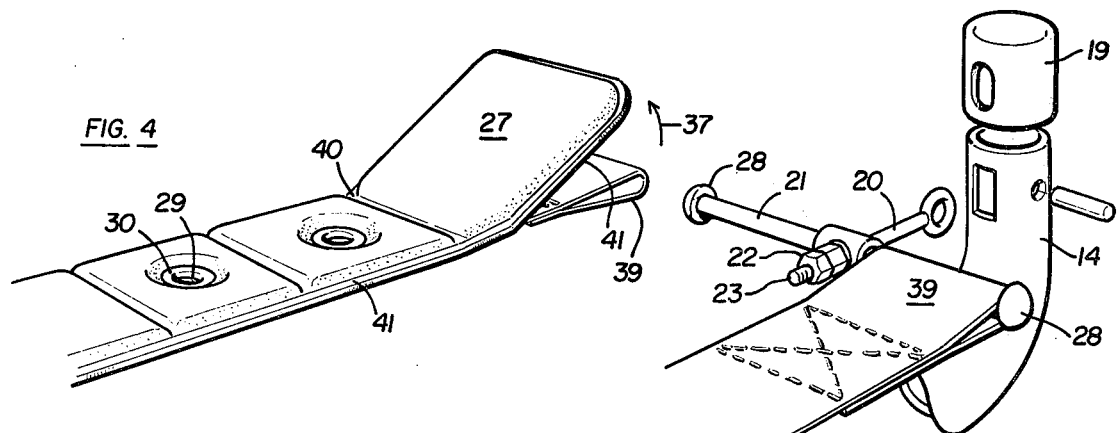
FIG. 4
FIG. 6
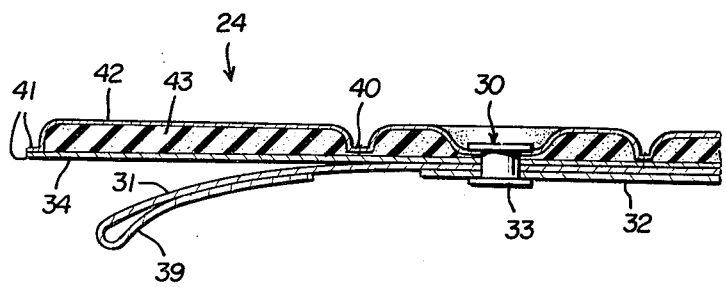
FIG. 5

1

BICYCLE SEAT

BACKGROUND OF THE INVENTION

The hammock type of bicycle seat which is disclosed in my U.S. Pat. No. 3,874,730 issued Apr. 1, 1975 provided an improved ride over the conventional bicycle seat particularly for long periods of riding. Conventional bicycle seats are relatively uncomfortable uncomfortable because all the weight of the rider is put into one small area and, further, the conventional seat does not flex with the rider's body, although some effort was made to use springs or cushions in the prior art.

The hammock type of seat of the aforementioned patent provided support over the entire backside of the rider and thus distributed the weight over a much wider area. The hammock type of seat can be fit over any bicycle bar. However, the webbing used in the hammock type of seat can become relatively slippery and also tends to rub against the rider and may become somewhat uncomfortable after a long ride, particularly during warm weather, where the material may become hot and slippery due to perspiration.

The safety webbing of the previous hammock type seat was allowing slippage to occur, particularly when the moisture became a factor. The conventional bicycle seat requires slippage to occur between the rider's clothing and the seat but the construction of a hammock type seat is such that the prevention of slippage is a desirable feature as it would add to the rider's comfort.

SUMMARY OF THE INVENTION

The present invention contemplates an improved hammock type of bicycle seat with a U-shaped frame with a flexible pair of relatively narrow elongated webbing material members, each covered by a pad. The improved bicycle seat construction allows for greater comfort because the pad provides a softened seat which gives or flexes with the body of the rider as pedaling occurs. Likewise, the rough finish of the pad cover promotes adherence to the clothing of the rider. Further, the seat construction covers the seat hardware to avoid getting grease or oil on the rider, while the hardware still remains easily accessible should adjustment in the seat be necessary. This adjustment can be made without removing any portion of the seat or pad structure.

The pad is itself covered by a frictionally roughened surface and sectioned into several pieces. The sectioned pad has a plurality of reduced thickness areas which allow the pad as a whole to retain flexibility. Each resulting section, in the center of the pad, has a hole with the end sections of the pad being similar in construction to the remaining center sections except for the lack of the hole. These end sections have a rectangular shape whose width is greater than the remaining pad sections.

The web which is held to the pad by a thin sheet material, stitching, and the hole-forming mechanism, is not attached to the end section, thus permitting the end section to be movable or loose with respect to the seat structure. This allows for ease of adjusting the tension of the pivot arm of the seat structure by holding the end flaps or sections up and out of the way. Additionally, since the bottom of the end section is of a smooth slippery material, the motion of the rider will allow slippage between the bottom of the end section and the webbing, thus giving improved comfort.

The ends of the webbing are formed into a loop and connected to the U-shaped seat as provided in the U.S. Pat. No. 3,874,730. When both pads are connected to the seat holding structure, the resulting seat has a small open space between the center sections of the respective pads. The open space permits the retained advantage of flexibility and allows comfort by permitting air flow and the "closed" end sections prevent the rider from being exposed to the the pivot arm assembly.

The holes in the center section provide a source of air flow. In addition, the hole construction contours the center portions of the sections to form depressed areas which are both more comfortable to the rider and increase the contact between the rider and the seat to prevent relative slippage therebetween.

These and other objects and advantages of the invention will become apparent upon reading the following description, of which the attached drawings form a part.

DESCRIPTION OF THE DRAWINGS

FIG. 1 illustrates, in perspective, a bicycle including the improved seat with a rider;

FIG. 2 is a perspective view of the seat with the improved pads;

FIG. 3 is a view of the bottom of one of the improved pads and the safety webbing;

FIG. 4 is a perspective view of the pad and attached safety webbing;

FIG. 5 is a cut away view of the pad structure with the webbing; and

FIG. 6 is an exploded perspective view of the crossbar of the seat frame.

DETAILED DESCRIPTION

FIG. 1 illustrates the improved seat 10 secured upon the frame of a conventional bicycle 11 and carrying a rider 12. The seat is arranged transversely of the bicycle frame and spans the backside of the rider.

The seat shown in FIG. 2 includes the seat frame 13, preferably formed of straight rigid rubing, whose opposite ends are bent upwardly to form legs 14 connected by the straight base 15. Secured centrally of the base, as by welding is a mounting shaft stub 16 of sufficient length to be inserted within the conventional bicycle frame seat shaft socket 17 and to be fastened therein and held against movement by a conventional clamping collar 18. The height of the seat relative to the bike frame may be adjusted by movement of the stub shaft relative to its receiving socket.

A plastic cap 19 may be fitted over the free end of the legs 14, with the bolt 20 as shown in FIG. 6 extending through a hole in the cap 19. The bolt 20 extends through a crossbar 21 and is held on by a lock nut 22 and washer 23. Returning to FIG. 2, the pads 24 and 25 are shown attached to the legs of the U-shaped frame. Each of the pads contain several center sections 26 and two outer sections or flaps 27. The outer flaps 27 cover the crossbar member 21 between two enlarged portions of the crossbar labeled 28. Also visible in FIG. 2 is the center hole 29 and the top 30 of a grommet which is the illustrated method of forming a hole but heat sealing or other obvious methods may be used.

The seat cover or pad is formed like an elongated envelope transversely open near its opposite ends. The transverse lines of heat sealing form hing-like connections for better flexibility. The heat seal lines on each end of the center section makes a hinge to permit end section to swing up and down but they tend to stay down due to the plastic memory of the bottom sheet 34.

The FIG. 3 illustrates the underside of the pad 24 with the elongated webbing member 31 shown covered by a thin sheet 32 in which there are holes 29 and the bottom 33 of the grommets. The remainder of the pad is illustrated at 34 which is a smooth material which extends across the entire length of the pad. The pads 24 and 25 may be foam filled or any other soft resilient material obvious to use to provide comfort and padding. Also shown at 38 are stitching threads used as a further means of fastening the webbing to the pad. As can be seen from the FIG. 3, the width of the end flaps is greater than that of the center section. This is further illustrated in FIG. 2 wherein the two pads 24 and 25 are placed together such that the space 36 is formed at the center sections while the end flaps or sections 27 engage with substantially no space between. This promotes comfort and provides air flow through the sections as well as protecting the rider from grease or oil which comes from the attendant bolts 20, nut 22 and washer 23 as illustrated in FIG. 6. FIG. 4 illustrates with arrows 37 the manner of lifting the flaps or end sections 27 out of the way to work on the attendant structure for loosening or tightening the bolt for rider comfort. This is accomplished because of recessed area 40 which acts as a hinge to permit lifting of the flap.

FIG. 5 shows a cut-away side view of the pad 24 with the webbing member 31 and loop 39 being held by the thin sheet 32 and the grommet structure 30 and 33. Thus, the webbing member 31 is sandwiched between the smooth bottom portion 34 of the pad 24 and the thin sheet 32 by means of the two-piece grommets 30 and 33. The pad 24 shown in cut-away detail has a top covering 42 having a frictionally roughened surface and a soft resilient filling 43 between the surface 43 and smooth bottom portion 34.

Also visible in FIG. 5 is the recessed area 40 between the outer section flap 27 and the center section. This recessed area 40 acts as a hinge to allow the flap to be lifted or rotated as previously detailed in connection with the FIG. 4. Likewise, there is shown in FIGS. 4 and 5 an outer recessed area at 41. This is formed by means of a heat seal, but the outer edge may be formed by any other means of affixing the top (frictionally roughened surface) to the bottom smooth material of the pad.

The holes, while illustrated as grommets, may be by heat sealing, punching or any other similar means. The frictionally roughened surface for the pad covering may be, for example, suede-covered porous (i.e., air pervious) Naugahyde. Any other suitable material may be used which provides a suitable surface to help prevent slippage between the rider and the seat.

The recessed areas between the sections of the pad 24 illustrated at 40 in FIG. 5 may be by heat sealing or any other method of obtaining the objective of a recessed area for purposes of flexibility and to serve as the hinge for the end flaps 27.

The improved bicycle seat may be affixed to any bicycle frame and presents a comfortable riding surface covering substantially more area than the normal bicycle seat. The holes in the several sections of each pad provide for air flow to reduce perspiration or any moisture problems. Further, the holes provide a depression or padded socket around the hole area at the center of each section. When formed, the depression provides a better gripping surface for the rider and prevents slippage and gives more flexibility. The two pads are placed alongside each other in such a manner that the rider is protected from grease and oil from the frame by the end sections of the pad and allows for a separation between the center sections of the respective pads for improved flexibility and comfort.

Having fully described an embodiment of this invention, I now claim:

1. In a bicycle seat having an elongated, U-shaped seat frame having a pair of generally parallel upwardly extending legs interconnected by an elongated base portion having a longitudinal axis, and an elongated, relatively narrow, flexible seating strip formed of a relatively stretch-resistant material, extending between said legs above said seat frame base to define the seat supporting surface extending generally perpendicular to the bicycle longitudinal axis to cradle a rider's adjacent body portion wherein the improvement comprises: a pad, having a center section having a plurality of depressed areas and an end section on each side of the center section wherein the top material of said pad has a frictionally roughened surface and said bottom material is relatively smooth and covers the entire bottom of said pad; a thin sleeve holding said flexible strip between said smooth bottom material and said thin sleeve wherein said thin sleeve covers the bottom of said center section of said pad such that said pad and said thin sleeve form an elongated envelope transversely open near its opposite ends with said flexible strip extending through said envelope.

2. A seat according to claim 1 wherein said center section is heat sealed, thereby creating narrow areas of reduced thickness perpendicular to the lengthwise edges and running across the entire width of said pad to form a plurality of center sections.

3. A seat according to claim 2 wherein each said center section formed by said areas of reduced thickness contains a hole in the center of said center section such that the top center of said center section contains a depressed area surrounding said hole.

4. A seat according to claim 3 wherein said seating strip comprises a pair of narrow, belt-like strip members arranged side-by-side in a common plane and on the opposite sides of each of the transverse members.

5. A seat according to claim 4 wherein the end sections have a width greater than the center sections and wherein the excess width is on one edge of the end section.

6. A seat according to claim 5 wherein said flexible strip comprises two webs and a pad covers each said web in such a manner as to have the sides with the excess width of the end section of one pad abutting the side of the other pad end section with the excess width, thus creating a space between the respective center sections of the two pads while having a substantially continuous surface across the entire width of the two pads at the end sections on both sides of the center sections.

* * * * *